United States Patent [19]

Mulso, Jr. et al.

[11] 4,410,208
[45] Oct. 18, 1983

[54] VEHICLE IMPACT ENERGY ABSORBING BUMPER MOUNT

[75] Inventors: Frank A. Mulso, Jr., Lake Orion; Juan J. Smith, Utica, both of Mich.

[73] Assignee: Chrysler Corporation, Highland Park, Mich.

[21] Appl. No.: 317,653

[22] Filed: Nov. 2, 1981

[51] Int. Cl.³ .............................................. B60R 19/00
[52] U.S. Cl. .................................. 293/132; 180/271; 280/784
[58] Field of Search ...................... 293/132, 133, 134; 280/784; 180/271; 52/632, 118

[56] References Cited

U.S. PATENT DOCUMENTS

| | | | |
|---|---|---|---|
| 2,713,774 | 7/1955 | Heintzmann | 52/632 |
| 3,412,628 | 11/1968 | De Gain | 180/271 |
| 3,495,474 | 2/1970 | Nishimura | 180/271 |
| 3,717,223 | 2/1973 | Alfes | 293/133 |
| 3,779,591 | 12/1973 | Rands | 293/133 |
| 3,860,258 | 1/1975 | Feustel | 293/133 |

Primary Examiner—Bruce H. Stoner, Jr.
Assistant Examiner—John A. Carroll
Attorney, Agent, or Firm—Newtson & Dundas

[57] ABSTRACT

An impact absorbing bumper mounting unit for automotive vehicles includes inner and outer nested members of C-shaped configuration. The outer member has a composite shape with one corrugated end portion fixed to a bumper assembly and its other C-shaped section portion adapted for attachment to the vehicle frame. The inner member has a uniform C-shaped section with its one end fixed to the bumper assembly and its other free end spaced from the frame attached end of the outer member. The composite outer member provides an impact absorbing corrugated portion and a C-sectioned guide portion which cooperates with the inner member for controlled coaxial collapse of each mounting unit during a low speed impact obviating damage by the bumper assembly to the body work.

3 Claims, 7 Drawing Figures

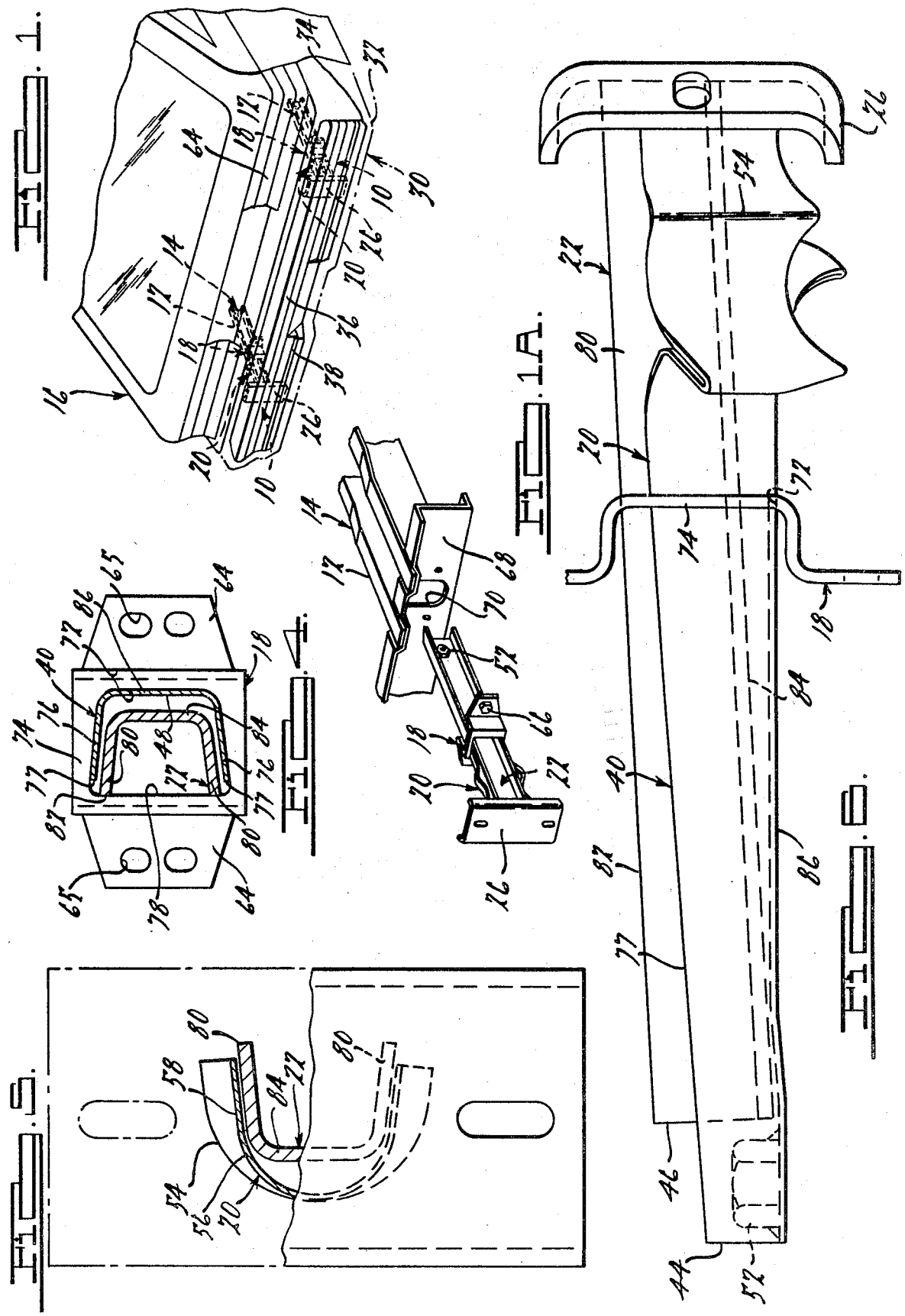

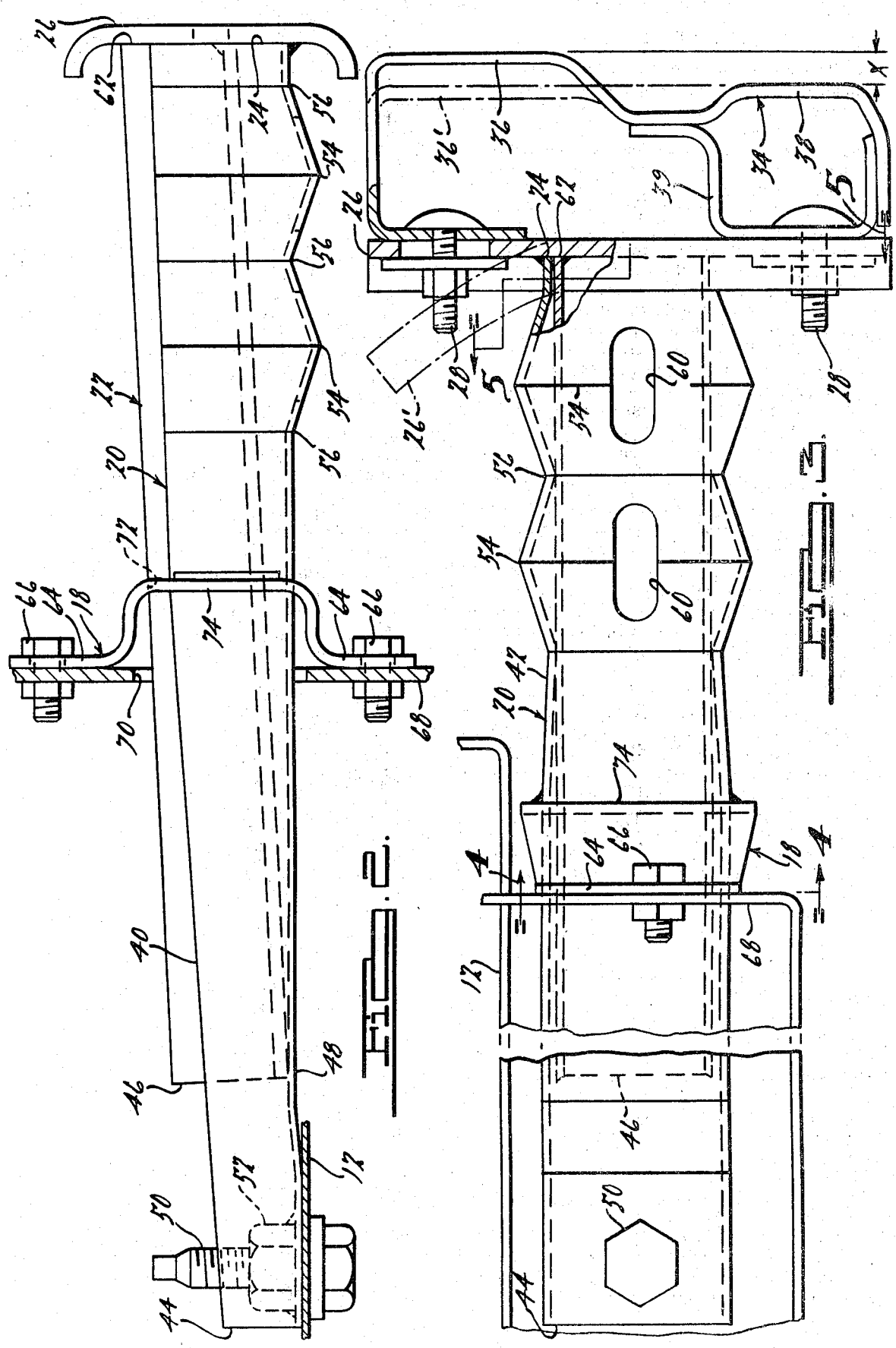

VEHICLE IMPACT ENERGY ABSORBING BUMPER MOUNT

BACKGROUND OF THE INVENTION

This invention relates to impact absorbing bumper mounting units for vehicles and more particularly to improved controlled collapse mounting units for automotive bumpers.

Various designs for collapsible bumper mounting units have been proposed providing bumber assemblies with impact absorption. Examples of such prior art mounts are shown in U.S. Pat. Nos. 3,495,474 to Nishimura et al and 3,412,628 to DeGain. These patents teach bumper assemblies supported to the frame of a vehicle by corrugated tubular members wherein the plastic deformation of the members during impact is varied by means of a plurality of slits disposed axially and parallel to each other on the periphery of the corrugations. This allows varying the impact absorption properties of the tubes by the number and size of the slits. A further example of a bumper mount is disclosed in U.S. Pat. No. 3,860,258 wherein controlled energy absorbing bumper supports include collapsible corrugated frame portions.

SUMMARY OF THE INVENTION

The present invention is directed to an improved vehicle impact absorbing bumper mount comprising a novel combination of components serving to prevent or minimize damage to the vehicle during low-speed impacts. The structure of this invention absorbs the impact force of a collision substantially along the mounting unit axis preventing cramping of the bumper assembly into the body work such as the vehicle skin, exterior lighting components and the like.

In accordance with the preferred embodiment of this invention each bumper mount has an inner C-shaped member that nests in an outer composite C-shaped and corrugated member. The outer member includes a bumper bracket end portion formed with a plurality of radiating substantially half-round corrugations operative for controlled plastic deformation upon a low level impact load striking the bumper. The composite member has a C-shaped section end adapted for attachment to the vehicle frame. The inner member has an axial dimension less than the outer composite member such that the outer member C-shaped section portion serves as a guide during relative movement caused by an impacting force on the bumper assembly. This allows the mounting units to maintain the bumper assembly substantially in the horizontal plane of the units during low speed impacts on the bumper. It is an object of the invention to provide a low cost, easily fabricated bumper mount that prevents the bumper assembly from being cramped or deformed upwardly into the body work during low speed impacts, and that may be easily removed for disposal after a collison.

These and other objects and advantages of the invention will be apparent from the following detailed description and drawings.

BRIEF DESCRIPTION OF THE DRAWINGS

FIG. 1 is a perspective view of a portion of an automotive vehicle rear bumper assembly mounted to the frame by a pair of impact energy absorbing mounting units in accordance with the invention.

FIG. 1A is an exploded view of one bumper mounting unit and a portion of the frame;

FIG. 2 is an enlarged top view of one of the mounting units in a normal uncollapsed position;

FIG. 3 is an enlarged side view of the unit of FIG. 2, partly in section, with the bumper bar shown;

FIG. 4 is an enlarged vertical section taken on line 4—4 of FIG. 3;

FIG. 5 is a view similar to FIG. 4 taken on line 5—5 of FIG. 3; and

FIG. 6 is a view similar to FIG. 2 showing the mount after a low speed impact.

DETAILED DESCRIPTION OF THE INVENTION

Referring now in detail to the drawings there is shown in FIG. 1 a pair of energy absorbing mounting units 10 each secured to side rails 12 of the frame 14 of a vehicle 16 by attachment means including frame brackets 18. Each energy absorbing unit 10 includes outer 20 and inner 22 nested coaxial C-shaped section members extending substantially parallel to the longitudinal axis of the vehicle 16.

As best seen in FIGS. 1 and 3 the outer member 20 has its one rearward end 24 away from the vehicle secured, as by welding, to the inner surface of a bumper braket 26. The brackets 26 support, by suitable means such as bolts 28, a bumper assembly generally indicated at 30 in FIG. 1. In the disclosed embodiment a rear bumper assembly is disclosed which includes a plastic fascia 32 supported by a transverse fascia reinforcement metal bumper bar 34. The bumper bar 34 is an "offset" member having an upper rearwardly offset portion 36 shown in FIG. 3 offset a distance "X" from a lower portion 38. Suitable attaching brackets 39 are attached, as by welding, to the bumper bar for reception of the bolts 28.

The corrugated portion of the outer member 20 is formed with a plurality of radiating corrugations having peaks 54 and intermediate valleys 56. As seen in FIG. 5 the corrugated valleys 56 and peaks 54 are formed with a substantially half-circle cross-section terminating in laterally diverging tagent-flange portions 58. Each of the corrugations is shown provided with a single longitudinally extending slot 60 having a predetermined length and width. Each slot 60 has its principal axis disposed on the horizontal plane of symmetry of the outer member. This arrangement allows the plastic deformation of the mounting units to be readily "tuned" or determined by varying the width of the pair of slots 60, controlling the rate of deformation of the outer member corrugated portion.

The inner member 22 has a uniform or constant U-shaped cross section throughout its length with its one end 62 fixedly secured to the inner surface of bumper bracket 26 as by welding. Each inner member 22 serves as a guide or tongue to maintain the mounting units 10 substantially in their common horizontal plane during low speed impacts. As the corrugated portion of member 20 collapses the bumper assembly 30 and inner member 22 move axially relative to the outer member 20 C-shaped portin 40. This controlled axial travel prevents the bumper assembly from being cramped or deformed upwardly into the body work such as the vehicle tailight and body structure 64 during low speed impacts. Thus, the composite outer member 20 provides a kinetic energy plastically deformable absorbing corrugated portion and a C-shaped section guide portion 40 that cooperate with the inner channel member 22 for controlled collapse during low level impact loads.

As an example the mount shown is designed for corrugation collapse at 5 MPH fixed barrier impact or 10 MPH car-to-car impact to limit damage to the bumper system and body works. At slower impacts, i.e., 5 MPH car-to-car or 2½ MPH barrier, no exterior visible damage occurs to the vehicle or the bumper assembly.

The disclosed bumper mounts are particularly suitable in cases where the impact force applied to the bumper car is off-center from the principal axis of the mounting units 10. This may occur, for example, when the bumper bar 34 is formed with an upper offset portion 36 which is initially impacted and deformed inwardly to a phantom lined position 36' a distance "X" prior to the lower portion 30 being impacted. In this case the bumper bracket 26 upper portion is deformed in a controlled manner to its ghosted position 26' of FIG. 3 while the inner member free end 46 is moved axially relative to the outer member portion 40 to a location approaching the nut 52 as seen in the collapsed mount of FIG. 6. Further, by orienting the member 20 such that the open side of the C-shaped portion faces laterally the corrugated portion collapses into contact with the inner member 22 to insure controlled travel of the relatively moving bumper assembly 30 in the horizontal plane of the mounts.

In the preferred form the frame mounting means includes the hat-sectioned frame bracket 18 with its mounting flanges 64 having holes 65 secured as by bolts 66 to the transverse frame member 68 shown in FIG. 1A provided with a mount receiving opening 70. As best seen in FIG. 4 the frame bracket 18 has a generally rectangular aperture 72 formed in its transverse web 74 for receiving the bumper mount nested members 20 and 22 therethrough. It will be noted in FIG. 4 that the outer member C-section portion has side flanges 76 shown diverging outwardly at a slight angle of between 5 to 10 degrees. Each side flange 76 edge 77 terminates a predetermined distance from vertical inner edge 78 of aperture 72.

The inner member 22 has its side flanges 80 formed so that they diverge outwardly at an angle of about 5 to 10 degrees in substantial conformity with their associated side flanges 76. The inner member 22 is sized such that its base wall 84 juxtaposed with base wall 86 of the outer member U-shaped portion 40. This construction allows the frame bracket aperture 72 to maintain the members to conforming nested relation while permitting relative coaxial movement therebetween.

It will be appreciated that by virtue of the outer channel member corrugated portion being of substantially half-round section the member 20 is relatively inexpensive to produce. In the disclosed form member 20 is forged by a single stamping from high-strength sheet steel.

What is claimed is:

1. In combination with a motor vehicle, an impact absorbing structural assembly comprising, a transversely extending bumper bar, a pair of identical bumper mounting units attached to the vehicle frame and extending longitudinally therefrom, each said mounting unit having outer and inner generally channel-shaped sheet metal members nested in substantially coaxial relation, each said outer member having a composite shape with its one bumper end portion away from the vehicle formed with a plurality of substantially half-round corrugations, each said outer member having its remaining vehicle end portion formed with a C-shaped section, each said inner member and its associated outer member vehicle end portion having substantially parallel side flanges and vertical bight walls, means attaching said outer member one end portion and its associated inner member one end to bumper bracket means on said bumper bar, each said associated inner and outer member having a predetermined longitudinal dimension such that said outer member vehicle end portion extends a defined axial distance beyond its associated inner member vehicle end, means securing said outer member vehicle end portion to the vehicle frame, said securing means operative for maintaining said outer member vehicle end portion and said inner member in nested relation while permitting said inner member to move axially relative to said outer member vehicle end portion, whereby an impact force of a predetermined level on said bumper bar is absorbed by plastic deformation of said outer member corrugated portion being axially foreshortened and collapsed into contact with its associated inner member, resulting in controlled longitudinal guided travel of said inner member and said bumper bar relative to said outer member vehicle end portion, such that the impact force moves said bumper bar substantially in a horizontal plane defined by said pair of mounting units to thereby obviate damage to body parts of the vehicle by said bumper bar.

2. The combination as set forth in claim 1, wherein said outer member and its associated inner member being disposed with their open sides facing in a common lateral direction, the free edges of each said inner member side flanges extending a defined lateral distance beyond the free edges of its associated outer member vehicle end portion side flanges, and wherein each said securing means comprising a frame mounting bracket having a transverse web formed with an aperture substantially conforming to said nested inner and said outer members vehicle end portion transverse section, such that one vertical edge of said aperture contacts the free edges of its associated inner member side flanges thereby maintaining said inner member in nested relation with its associated outer member vehicle end portion.

3. In combination with a motor vehicle, an impact absorbing structural assembly comprising, a transverse bumper bar having an off-set impact receiving face, a pair of bumper mounting units attached to the vehicle frame and extending longitudinally therefrom, each said mounting unit having outer and inner generally channel-shaped members each formed of sheet metal and being nested in substantially coaxial relation, said members disposed with their open sides facing in a common lateral direction, each said outer member having a composite shape with its one bumper end portion away from the vehicle formed with a plurality of substantially half-round corrugations diverging radially outwardly at a slight angle from its horizontal plane of symmetry, each said outer member having its remaining vehicle end portion formed with a C-shaped section defined by planar side flanges joined by a vertical bight wall, said inner member of constant C-shaped section substantially conforming in nested relation to its associated outer member vehicle end portion, means attaching said outer member one end portion and its associated inner member one end to a bracket fixed on said bumper bar, each said associated inner and outer member having a predetermined longitudinal dimension such that said outer member vehicle end portion extends a defined axial distance beyond its associated inner member vehicle end, a frame mounting bracket securing each said outer member vehicle end portion to the vehicle frame, said bracket having a transverse planar portion formed with a generally trapezoidal shaped aperture substantially conforming to said outer member vehicle end portion transverse section, such that one vertical edge of said aperture contacts the two free edges of its associated inner member side flanges, whereby an impact force of a predetermined level on said bumper bar off-set face is absorbed by plastic deformation of each said outer member corrugated portion being axially foreshortened resulting in controlled longitudinal guided travel of each said inner member and bumper bar relative to each said outer vehicle end portion, such that the impact force moves the bumper bar substantially in the horizontal plane defined by said pair of mounting units so as to resist any initial off-center impact force on said off-set face from rotating the bumper mounting units and bumper bar upwardly into contact with vehicle body parts.

* * * * *